2,993,801
METHOD FOR CONDITIONING EXTENSIBLE BALLOONS
Walter E. Hoehne, Chesapeake Beach, Md., assignor to United States of America as represented by the Secretary of the Navy
No Drawing. Filed Aug. 1, 1958, Ser. No. 752,682
5 Claims. (Cl. 117—7)
(Granted under Title 35, U.S. Code (1952), sec. 266)

The invention described herein may be manufactured and used by or for the Government of the United States of America for governmental purposes without the payment of any royalties thereon or therefor.

This invention relates to a method for conditioning extensible balloons and in particular for conditioning balloons made of neoprene and other synthetic rubber compositions.

Pretreatment of flight balloons of the type used in meteorological studies has been found advantageous, especially after prolonged storage, and is now considered common practice. The prior art method of treatment involved a heating process which restored plasticity to aging neoprene balloons. Balloons of neoprene and other synthetic rubber compositions which have laid in storage for some time show increased crystallite behavior as a result of molecular crosslinking. This crystallite behavior is characteristic of the more resistant, tough, unyielding nature of synthetic rubbers as contrasted with the pliable, more yielding, plastic nature of the same compositions which are free of crystallite formation. It is believed that active centers in the molecules of synthetic rubber become linked in time with adjacent molecules thereby resisting slippage between the molecules as evidenced by a reduction in the extensible property of aging rubber.

The recent practice of injecting metallic dipole elements in sounding balloons that are tracked by means of radar has extended the pretreatment of balloons by the added requirement that neoprene and other synthetic rubber surfaces be sufficiently clean and free from manufacturer's talc such that an adhesive material may be applied to surfaces on which the dipoles will adhere. It will be appreciated by those skilled in the art that the two-step prior method of preflight preparation has resulted in considerable inconvenience due to increased handling and accompanying operational time delays in the field. Meteorological balloons should be available for use with a minimum of site fabrication and handling in the field. Preflight fabrication should also be relatively simple and concise. Of course, any method adopted for conditioning extensible latex compositions should always assure maximum balloon ascents in flight.

Accordingly, the present invention provides a single agent to be applied on balloon surfaces made of rubber, in particular neoprene and other synthetic rubber compositions, thereby eliminating the need for any heat treatment of the balloons prior to flight. This single agent when applied on the surface of a rubber balloon conditions the rubber composition to the extent that it becomes more pliable and more extensible and results in larger balloon volumes. Balloon surfaces which are conditioned in accordance with this invention also become sufficiently adhesive to be capable of retaining metallic dipoles which may be contacted to balloon surfaces as an aid in radar detection. Furthermore balloon surfaces which are treated by this method are relatively noncohesive and do not stick to each other, even after the balloon has been folded, packaged and stored for a considerable time. Thus a single agent acts as a separator eliminating the prior requirement for talc or any other means of preventing rubber surfaces from sticking together; it acts as an adhesive agent and it also conditions synthetic rubber compositions to restore and preserve the plastic nature of said compositions.

It is therefore an object of the present invention to provide a method for conditioning neoprene extensible balloons after they have been in storage for some time.

It is another object to provide a method for treating neoprene balloons which is simpler and less time consuming than prior known methods and which reduces site fabrication of meteorological balloons to a minimum.

Another object of this invention is to provide a single agent which combines the activities of three separate functions in treating neoprene and other synthetic rubber balloons wherein the disadvantages of the prior art are minimized.

Still another object of this invention is to provide improved extensible balloons which attain greater burst volumes than balloons treated in accordance with the prior methods.

Other objects of this invention will become apparent from a study of the following specification which describes a typical embodiment of this invention.

The invention concerns extensible balloons which are treated with a single agent to obtain balloon walls that are more pliable, more easily extended to larger wall areas resulting in larger balloon volumes. The invention comprises the application of ethylene glycol on the surface of neoprene or other synthetic rubber compositions which have been fabricated into flight balloons. Preferably ethylene glycol, which may be of the usual commercial grade, is poured into the mouth of a deflated balloon in order to wet the inner surface. Alternatively the glycol may be applied by spraying, by injecting into a distended balloon in the form of a mist, or by any other convenient manner. The balloon is subsequently stored in order to allow for a sufficient time for the ethylene glycol to penetrate the rubber wall. It has been found that upon penetration of the ethylene glycol, the material becomes more pliable resulting in a more extensible balloon wall. The balloon structure is then capable of being inflated to substantially larger volumes as compared with balloon structures which have not been treated in accordance with the present invention. An average increase of 47% was observed in balloon volumes resulting from the conditioning of synthetic latex balloons with ethylene glycol as compared to the volumes of untreated balloons of the same age and fabrication and which are flown under identical weather conditions.

It has been determined that latex rubber balloons with ethylene-glycol-wetted surfaces can be stored for periods, for example, of from 6 to 9 months without any reduction in their plastic properties. Moreover, treated balloons do not show any significant aging effects. It has also been observed that balloons which were originally packaged without the glycol pretreatment and then stored, could be subsequently treated in accordance with the present invention whereupon the extensible quality and plastic nature of the balloon composition was greatly improved.

In the theoretical analysis of this invention it is believed that ethylene glycol acts as a post-plasticizer in the neoprene latex. The relatively small molecular size of ethylene glycol permits it to penetrate into the spacings between the relatively large neoprene molecules and in this manner provides solvating action to the neoprene structure. The presence of ethylene glycol, moreover, causes a reduction of the intermolecular forces between neoprene molecules and this reduction in the strength of the intermolecular forces results in a material which can be more easily extended.

It is within the scope of the present invention that ethylene glycol be applied to balloon structures at any time prior to their use. Preferably it should be applied to balloon structures immediately following their manufacture to prevent crystallite formations resulting from the aging process in latex and furthermore to prevent balloon surfaces from sticking during the initial storage thereof. During the process of manufacturing neoprene latex balloons, talc powder is essential and talc powder is left on the finished product by the manufacturer as a means of preventing sticking of neoprene latex surfaces. In accordance with this invention, the excess talc powder is removed by conventional means, such as dusting, or shaking out and replaced with ethylene glycol prior to storing said balloons in sealed cartridges or sealed plastic bags which are impermeable to ethylene glycol. It will be appreciated that flight balloons which are packed and stored in this manner may be unpacked and inflated in the field without the need for additional pretreatment and for special handling prior to flight. For sounding balloons utilizing metallic dipole elements, an injection gun may be used to inject dipoles in the inflated balloons. It will be appreciated that it is not necessary to add any liquid adhesive to an ethylene glycol treated surface since the treated surface is sufficiently adherent to serve for this purpose.

In operational tests of the invention, neoprene balloons with average burst volumes of about 18.2 cubic meters each were treated with ethylene glycol by pouring about 200 grams of the liquid into the mouth of each balloon. Each balloon was then packed in a plastic container which is impermeable to ethylene glycol and stored for periods of several months before they were tested. On the day of flight each balloon was removed from its container, inflated and flown without any further preparation of the latex structures. As an example of the performance achieved, two balloons that were conditioned with ethylene glycol sustained in ascents heights of 51,100 ft. and 49,816 ft. before the neoprene latex compositions finally burst. Other balloons which were not treated with ethylene glycol, as described herein, had lesser expansions and burst at heights of 40,624 ft. and 36,211 ft. Improved flight performances indicate substantially larger burst volumes with balloons treated in accordance with the present method, i.e. the latex wall stretches considerably more without bursting and thus the balloons attain higher ascent levels.

In another operational test, a neoprene latex balloon weighing 355.5 grams and having average burst volumes of about 18.2 cubic meters was wetted with 150 grams of ethylene glycol and stored for a period of 9 months. On the day of flight the ballon was removed from its container and prepared for flight with radiosonde equipment attached for the purpose of tracking its ascent. The balloon ascended to a height of 59,068 ft. before it finally burst; the calculated volume of the inflated balloon increased from 18.2 cubic meters to 38.8 cubic meters. An untreated balloon of identical construction which was in storage for 9 months and flown at the same time attained a height of 39,295 ft. before it burst, at a calculated volume of 14.4 cubic meters. The results indicate that the treated balloon reaches a height, one and one-half times as great as the untreated balloon, while the burst volume of the treated balloon was 2.7 times as large.

In still another operational test, balloons conditioned with ethylene glycol in accordance with the teachings of the present invention and balloons conditioned by the heat-treatment method of the prior art were compared. One balloon was wetted with 200 grams of ethylene glycol on both the inner and outer surfaces and stored away in an impervious plastic bag for a period of 9 months. The balloon was removed from storage and inflated on the day of flight, ascending to 51,592 ft. Another balloon of identical composition was preheated in boiling water for five minutes and flown at the same time as the glycol-treated balloon. It attained a height of 42,043 ft. which was substantially below the performance of the ethylene glycol-treated balloon of identical weight and size.

In each of the above operational tests radiosonde equipment was attached to the balloon to aid in tracking its ascent.

It is understood that it is within the purview of this invention to condition any synthetic balloon material in the manner prescribed. Also, it is understood that the period of storage may be varied in accordance with the material being conditioned.

Finally it is understood that this invention is to be limited only by the scope of the appended claims.

What is claimed is:
1. The method of conditioning a synthetic rubber balloon comprising the steps of applying ethylene glycol to the surface area of said balloon and storing said balloon in a sealed container impermeable to said ethylene glycol.
2. The method of conditioning a synthetic rubber balloon comprising the steps of removing the manufacturer's talc from the surface area of said balloon, applying ethylene glycol to said surface area of said balloon and storing said balloon in a sealed container impermeable to ethylene glycol.
3. The method of conditioning a synthetic rubber balloon comprising the steps of removing the manufacturer's talc from the surface area of said balloon, pouring a selected amount of ethylene glycol into the mouth of said balloon while said balloon is in a deflated state and storing said balloon in a sealed container impermeable to ethylene glycol.
4. The method of conditioning a synthetic rubber balloon in its distended state comprising the steps of removing the manufacturer's talc from the surface area of said balloon, inflating said balloon to its normal volume, spraying a selected amount of ethylene glycol on the surface area of said balloon and storing said balloon until ready for use.
5. The method of conditioning an aged synthetic rubber balloon comprising maintaining said balloon in contact with ethylene glycol for a time sufficient to restore the plastic nature of said synthetic rubber composition.

References Cited in the file of this patent

UNITED STATES PATENTS

| | | |
|---|---|---|
| 1,694,879 | Kurtz | Dec. 11, 1928 |
| 2,533,016 | Johnson et al. | Dec. 5, 1940 |
| 2,629,424 | Stegemann | Feb. 24, 1953 |
| 2,646,370 | Nelson | July 21, 1953 |
| 2,664,367 | Wilson | Dec. 29, 1953 |
| 2,752,594 | Link et al. | June 26, 1956 |